United States Patent [19]

Di Giacomo

[11] 3,950,477

[45] Apr. 13, 1976

[54] PROCESS FOR ARTIFICIALLY FORMING ROCKS

[76] Inventor: Philip A. Di Giacomo, 13246 Chandler Blvd., Van Nuys, Calif. 91401

[22] Filed: June 20, 1974

[21] Appl. No.: 481,049

[52] U.S. Cl. .................... 264/226; 264/35; 264/39; 264/40; 264/297; 264/316; 264/338

[51] Int. Cl.² .......................................... B29C 1/02

[58] Field of Search ............. 264/40, 219, 220, 225, 264/256, 313, 316, 338, 221-224, 226, 227, 297, 35, 39

[56] References Cited

UNITED STATES PATENTS

| | | | |
|---|---|---|---|
| 2,172,466 | 9/1939 | Edwardes | 264/225 |
| 2,472,754 | 6/1949 | Mead | 264/220 X |
| 2,499,324 | 2/1950 | Mead | 264/220 |
| 2,513,785 | 7/1950 | Browne | 264/220 X |
| 2,547,419 | 4/1951 | Sugarman | 264/338 X |
| 2,964,800 | 12/1960 | Dorsett | 264/316 X |

*Primary Examiner*—Robert F. White
*Assistant Examiner*—Thomas P. Pavelko

[57] ABSTRACT

A process for artificially forming rocks is described. The process provides for forming a rubber film mold of the surface of a natural rock. The rubber film mold is then placed on a bed of flowable supporting elements which are distributed to support the underside of the cavity of the rubber film mold such that it assumes a desired contour or shape. A filling of concrete poured into the cavity of the mold upon hardening and being turned over provides an artificial rock whose surface has the characteristic markings of the natural rock but may have any desired different overall contour or shape.

4 Claims, 20 Drawing Figures

Fig. 8.
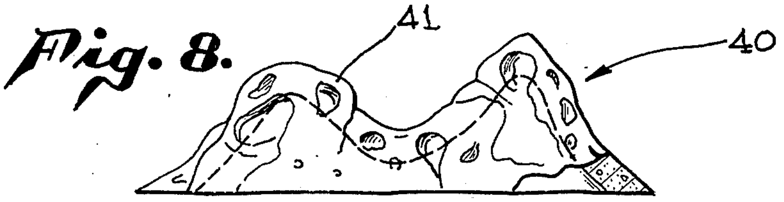
Fig. 7.
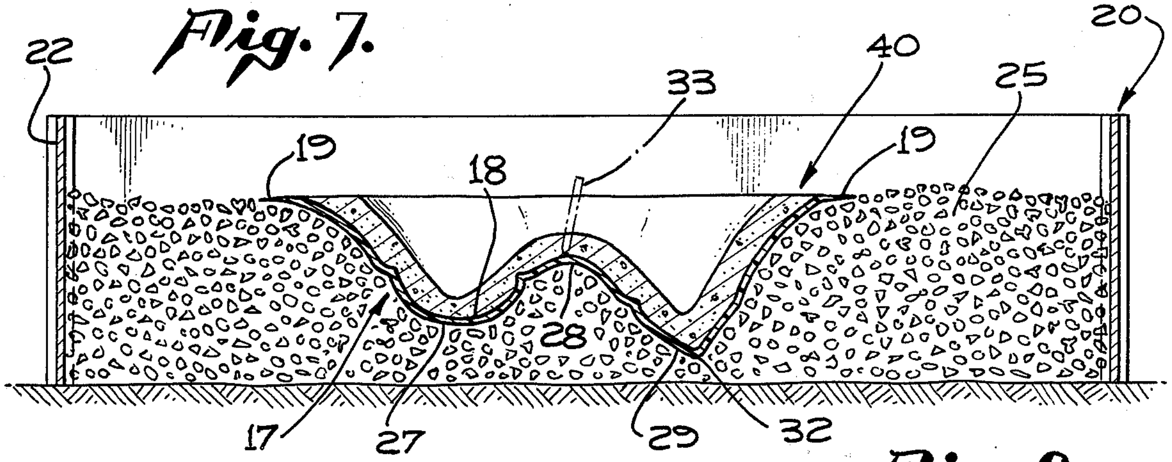
Fig. 9.
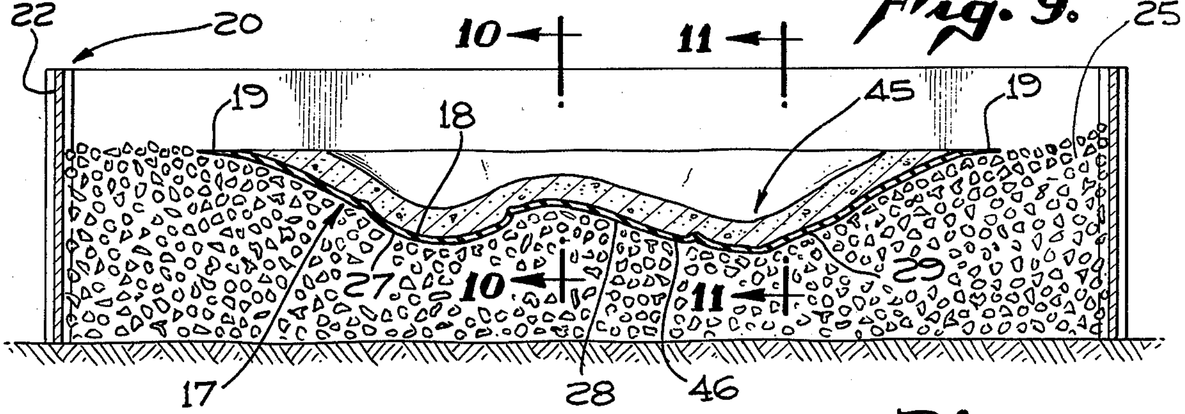
Fig. 12.
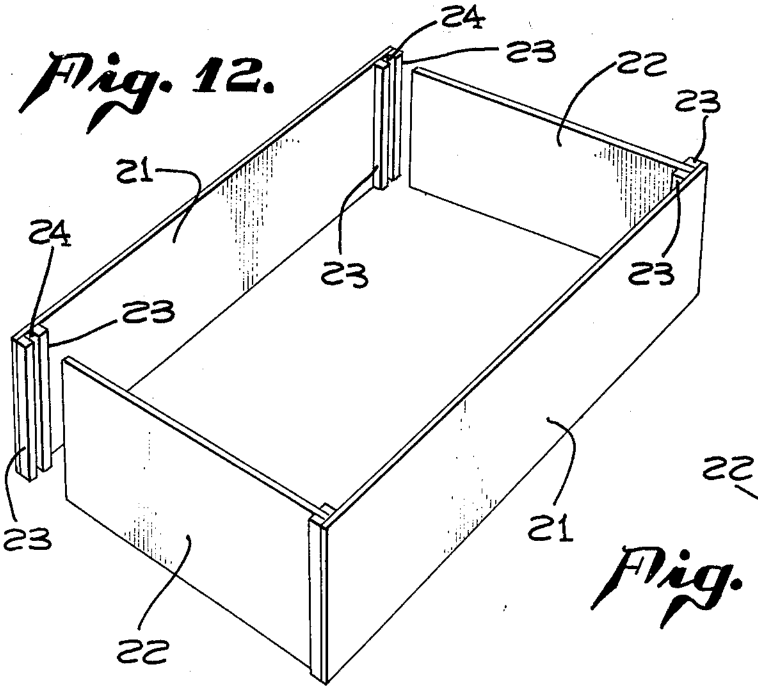
Fig. 10.
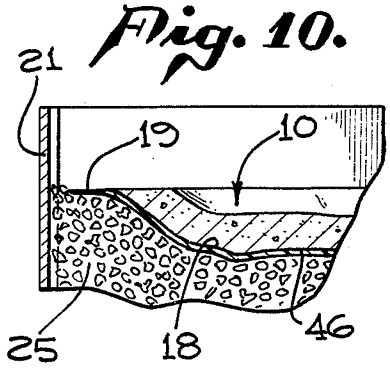
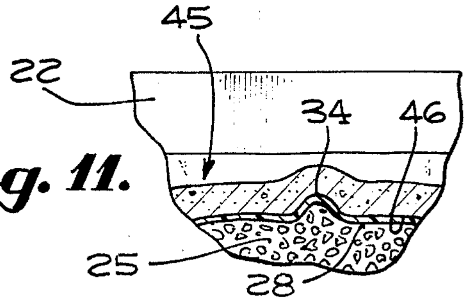
Fig. 11.

Fig. 13.
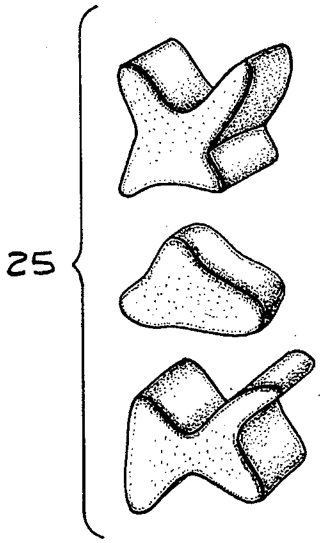
Fig. 14.
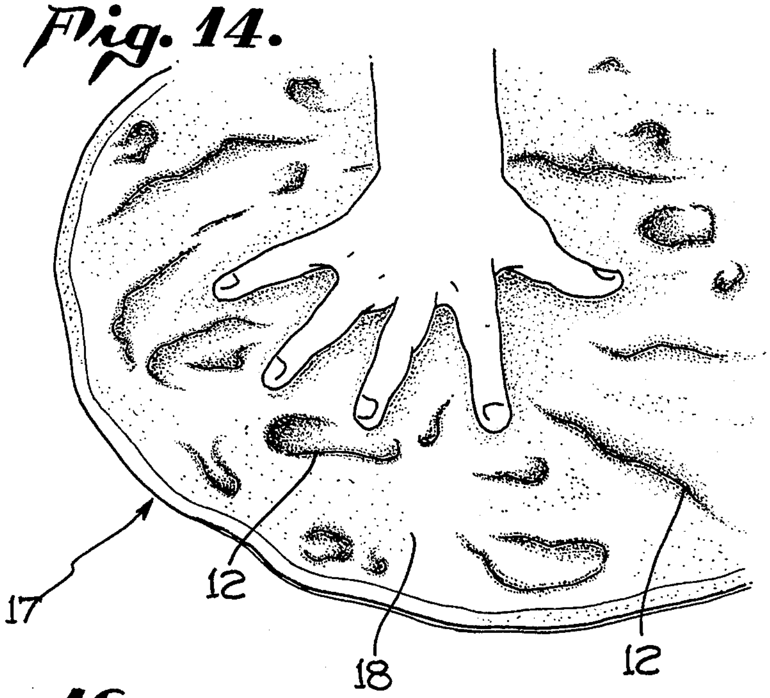
Fig. 16.
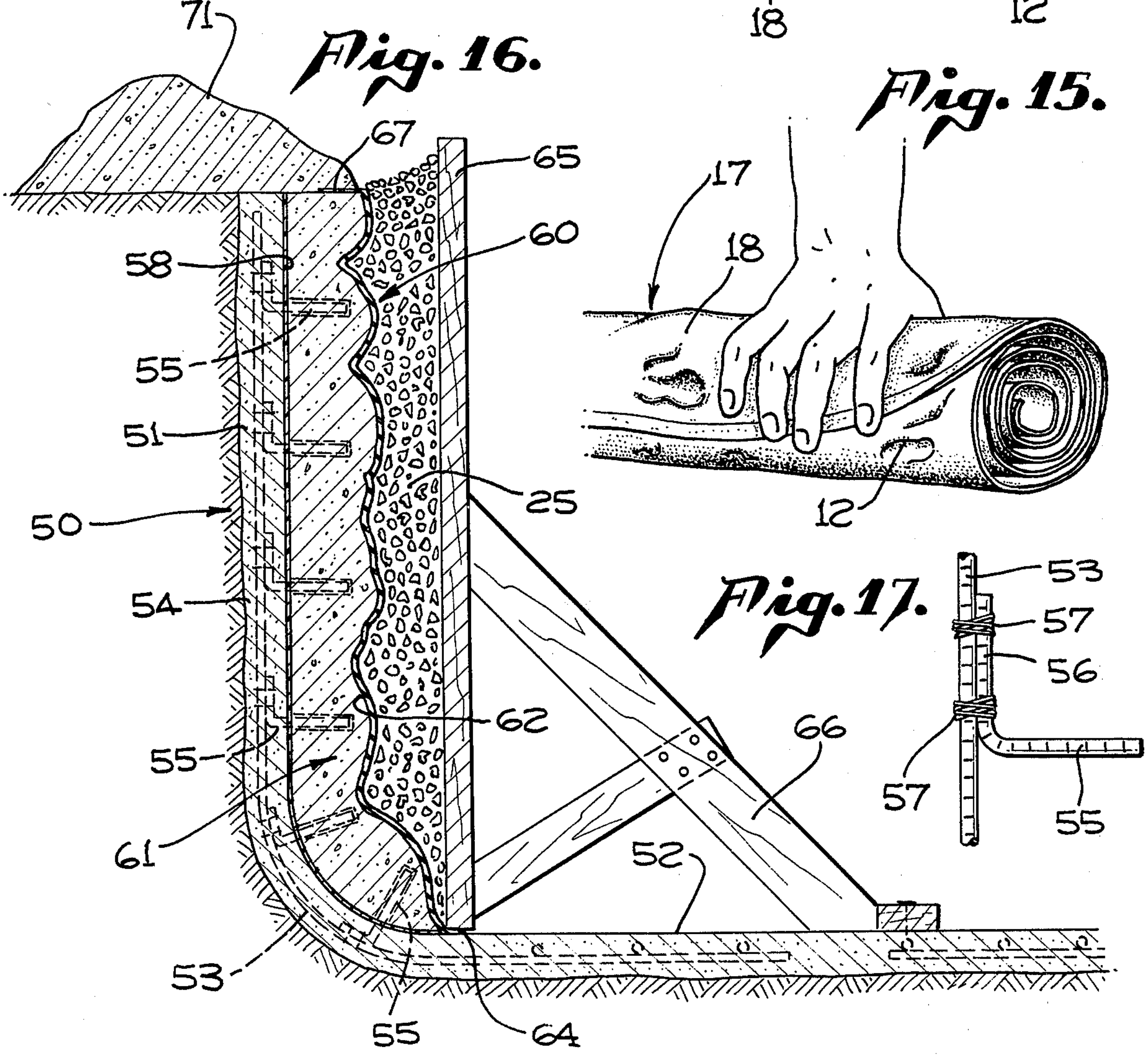
Fig. 15.
Fig. 17.

PROCESS FOR ARTIFICIALLY FORMING ROCKS

This invention relates to a process for artificially forming rocks, and, more particularly, to a process for casting a family or set of differently contoured rocks from a single rubber film mold made of the outer surface of a natural rock.

Rocks are commonly used for constructing and/or finishing many types of structures. In order to construct structures of natural rocks on commercial or residential sites, the rocks must usually be obtained from rural or similar out of the way places where they were naturally formed and presently reside, and then transferred to the desired construction site. When several large rocks are required for this purpose, the construction builder can be faced with a costly and almost impossible situation.

Because of the impracticality of transferring large size natural rocks to construction sites, it has been the practice in the past to artificially make rocks for structural uses. In accordance with this prior art process, a liner mold of latex rubber is formed over the surface of a natural rock while it remains in its natural setting. A framework is then placed about the rock and liquid urethane is poured into the framework such as to cover the liner mold several inches above its highest point. When the urethane hardens it provides a rigid support for the rubber liner mold. To artificially form a rock in accordance with this prior art process, this equipment is transported to the site of construction where the liner mold is placed in the cavity formed in the urethane mold support. A batch of concrete is then poured into the cavity of the liner. When the concrete hardens and is lifted out of the cavity and turned over, its concave surface has the characteristics of the natural rock cast thereon.

It should be apparent that when large artificial rocks are made by this prior art process the urethane support used for the rubber liner, although considerably lighter in weight than the original rock, is nevertheless large and cumbersome to handle. This is especially a problem if the mold equipment has to be shipped to sites in distant locations. Furthermore, in accordance with this prior art process, a particular liner mold and urethane support therefor provides for making rocks all having shapes which are identical to the natural rock. Thus, when a variety of differently shaped rocks are desired, as needed to construct a realistic structure, several different liner molds, each made from a different natural rock and each having its own urethane support, is required.

One of the objects of the present invention is, therefore, to provide an improved process for artificially forming rocks which eliminates the need for having a separate liner and support mold for each shaped or contoured rock being formed.

Another object of the invention is to provide an improved process for artificially forming from a single rubber film mold a large number of rocks which have common characteristic markings thereon, but which may all differ in overall contour and appearance.

Still another object of the invention is to provide a simplified and more economical process for artificially forming rocks for use in the construction industry.

Other objects, advantages, and features of the present invention will become apparent from consideration of the following description when taken in conjunction with the appended claims and drawings, wherein:

FIG. 7 shows a cross-sectional view of the framework with the bed of supporting elements therein redistributed to support the rubber film mold to thereby form a rock having an overall contour that is generally more elevated than the natural rock shown in FIG. 1;

FIG. 8 shows the artificial rock formed by the mold setup in FIG. 7;

FIG. 9 shows a cross-sectional view of the framework with the bed of supporting elements therein redistrituted to support the rubber film mold to thereby form a rock having an overall contour that is generally flatter than the natural rock shown in FIG. 1;

FIG. 10 is a cross-sectional, enlarged, detailed view of a portion of the rubber film mold and concrete filling as taken along line 10—10 of FIG. 9;

FIG. 11 is a cross-sectional, enlarged, detailed view of a portion of the rubber film mold and concrete filling as taken along line 11—11 of FIG. 9;

FIG. 12 is a perspective view of the framework used to contain the bed of supporting elements;

FIG. 13 shows typically shaped plastic foam elements used to provide the bed for supporting the rubber film mold;

FIG. 14 is a view showing a portion of the rubber film mold of FIG. 3 being flattened by hand prior to being rolled up;

FIG. 15 illustrates the rolled up rubber film mold of FIG. 3 ready for storage or shipment;

FIG. 16 shows a modified arrangement for using the process of the present invention to form the sidewall of a pool;

FIG. 17 is a detailed showing of a lateral steel rod attached to the steel frame;

Figure 1:
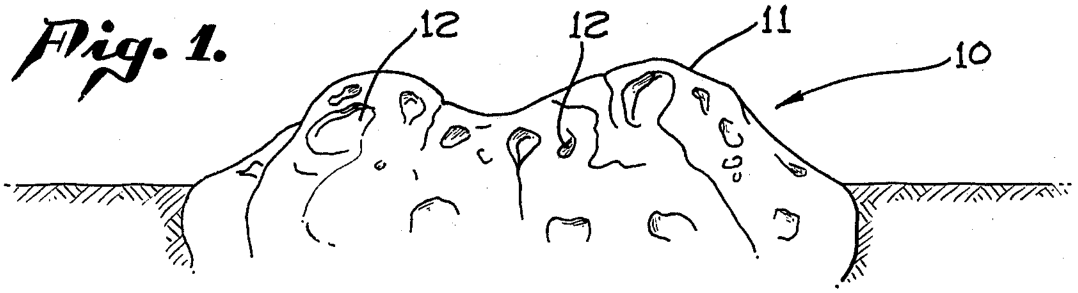
FIG. 1 illustrates a natural rock located in its natural setting.

Referring to the drawings, a large natural rock 10 in its natural setting away from the residential area is illustrated in FIG. 1. The physical appearance of the rock 10 is such that it has characteristic markings 12 on the surface thereof that are typical of where it is located. The markings 12 may be due to the manner in which the rocks were naturally formed and brought to rest, and also due to the weathering and erosion that the rocks have been subjected to over the years.

In accordance with the process of the present invention, in order to make a mold of the rock 10, the outer surface 11 of the rock is first cleaned to remove dirt, moss or loose particles therefrom. A release agent such as green soap or caster oil diluted with alcohol is then applied to outer surface 11. A thin coating of fast drying, low shrinkage, liquid latex is then applied by a brush over the entire or a portion of the exposed outer surface 11 of the rock 10. Care should be taken to provide a smooth, even first coating with all the air bubbles carefully brushed out. The brushing should be from the top of the rock 10 to the buttom, and then continue on out from the base a short distance to form a marginal overlap 19. The liquid latex should have sufficiently high viscosity so that it can be brush coated on vertically inclined surfaces without runs or sags.

Figure 2:
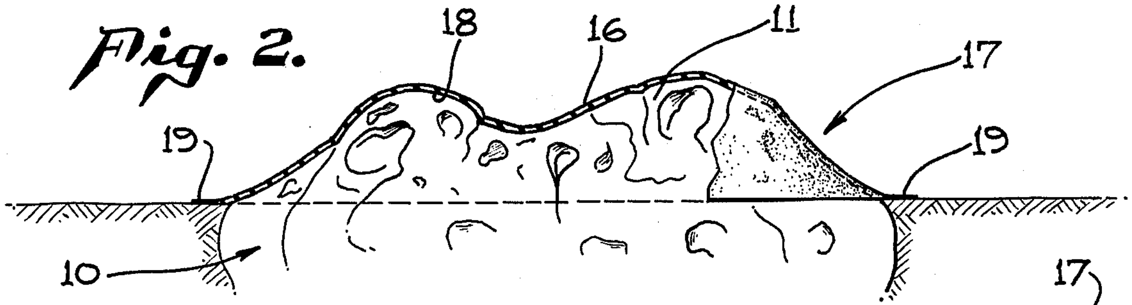
FIG. 2 shows a rubber film mold formed on the rock of FIG. 1 by applying coatings of liquid latex on the surface thereof.
Figure 4:
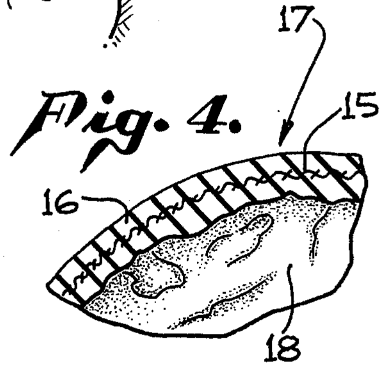
FIG. 4 shows an enlarged, detailed view of a portion of the rubber film mold shown in FIG. 3.

After the first coating has dried a second coating is applied. Before the second coating has a chance to dry, strips of cheesecloth or burlap 15 or similar fabric, as shown in FIG. 4, are positioned thereover to provide for reinforcing the rubber film 16 being formed. Additional coatings of liquid latex are then applied, as needed, until the thickness of the rubber film 16 so formed is approximately three-sixteenth inches thick. The coatings of latex when dried form a soft, pliable, good aging rubber film that will not phase out or separate on long standing. FIG. 2 shows the completed rubber film mold 17 formed on the natural rock 10.

Figure 3:
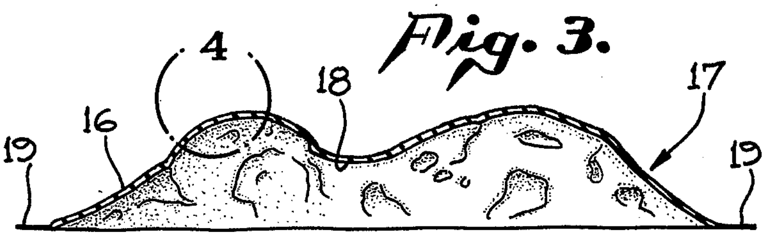
FIG. 3 shows the rubber film mold separated from the rock.

The rubber film mold 17 separated from the rock 10 is shown in FIG. 3. As indicated in FIG. 4, the surface 18 of the cavity of the mold 17 has reproduced the surface 11 of the rock 10 in exact detail. It should be evident that the rubber film mold 17 will tend to maintain the general shape of the natural rock 10 if supported in such a manner that no strain is placed on any portion thereof. However, the rubber film, being thin and pliable, can be readily distorted out of its unstressed orientation. To assist in this respect, the natural rock 10 selected to make the film mold 17 should preferably be one whose contour does not have extreme elevated and valley portions.

As shown in FIG. 12 a rectangular framework 20 is provided, formed of pairs of wood sidings 21 and 22. For ease in assembly, the ends of the sidings 21 have spaced vertical members 23 attached thereto such as to provide vertical slots 24 on each corner of the framework 20 for receiving the ends of the sidings 22. As shown in FIGS. 5–8, the confines of the framework 20 is filled with a bed of lightweight, irregular or odd shaped, polystyrene foam elements 25. As illustrated in FIG. 13, elements 25 are preferably in the general shapes of T's or X's or any other irregular configurations which have a tendency to have an interlocking action when a load is applied on the bed.

Figure 5:
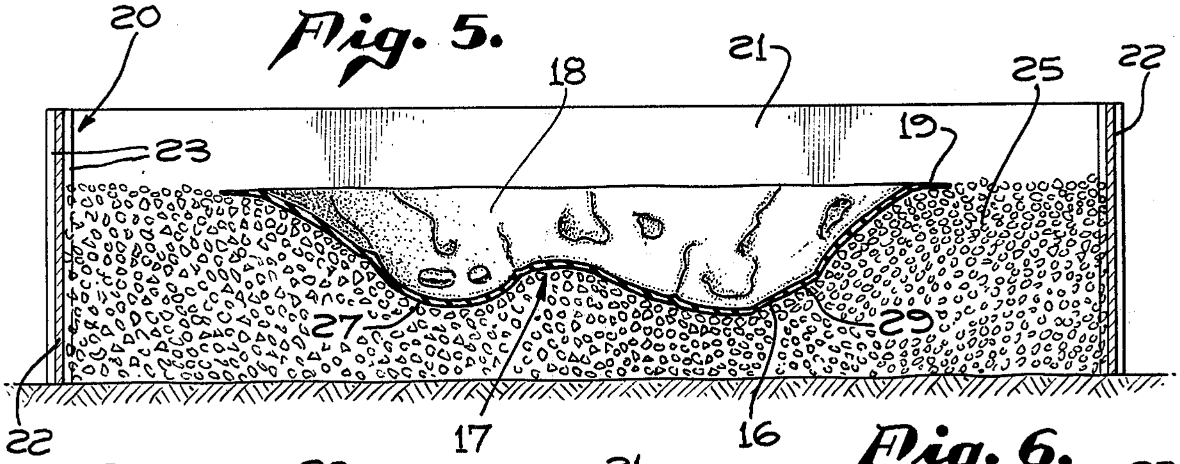
FIG. 5 is a cross-sectional view of a framework filled with a bed of loose, flowable elements which provide for supporting the rubber film mold in an inverted position thereon.

As shown in FIG. 5, the elements 25 thus provide a firm adjustable bearing bed for the rubber film mold 17 when the latter is placed in the framework 20 with the convex, underside of its cavity lying against the support elements 25. By shifting the elements 25 forming the bed about in the framework 20, portions of the film mold, such as portions 27, 28, and 29, can be supported by the supporting elements 25 so that the surface 18 of the cavity formed by the film mold 17 can assume, as in the instance of FIG. 5, a contour or shape corresponding to its natural unstressed orientation. A filling of concrete 30 is then poured into the cavity of the mold 17 and evened off along the surface 18 thereof by a trowel, for example. The texture of the concrete should preferably be fine enough so that it will fill the markings 12, such as crevices, pits, corners, protrusions, etc., formed on the surface of cavity 18 of the mold such that these characteristic markings will be cast on the surface of the filling of concrete 30 when it hardens.

Figure 6:
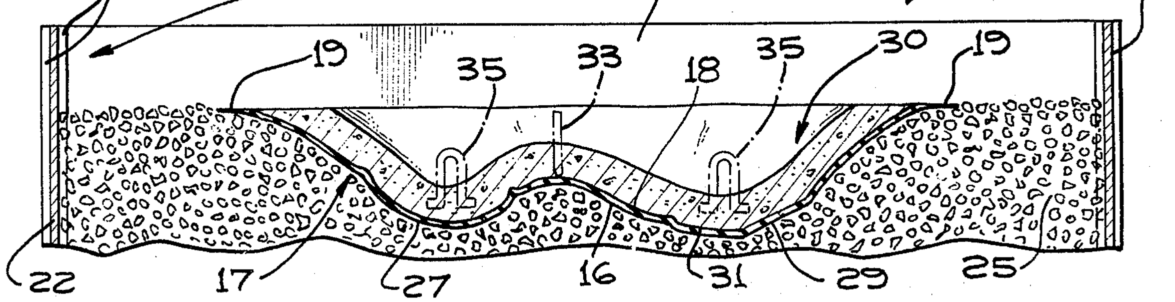
FIG. 6 is a view similar to FIG. 5 with a batch of concrete poured into the cavity of the rubber film mold to form a rock having a contour generally similar to the contour of the natural rock shown in FIG. 1.

In order to be sure that the concrete filling 30 in the cavity of the film mold 17 has the thickness at any point to provide the desired structural strength, a rod 33, as noted in FIG. 6, may be inserted through the soft concrete until it hits the inner surface 18 of the cavity. As also noted in FIG. 6, a pair of spaced hooks 35 may be imbedded in the concrete filling 30. It should now be evident that when the concrete filling 30, hereinafter referred to as the artificial rock 30, has hardened and been lifted by use of hooks 35 out of the framework 20 and turned over, its outer surface 31 is substantially a concrete likeness, i.e., a replica of the surface 11 of the natural rock 10 shown in FIG. 1.

It should now be evident that if in a particular residential or commercial area all of the artificial rocks used for constructional purposes were like artificial rock 30, which has substantially the identical overall contour and markings of the natural rock 10, it would be quite evident to an observer that the structure was built from artificial rocks. Accordingly, in order to make additional artificial rocks by use of the process of the present invention, the same rubber film mold 17 is again positioned in an inverted position in the framework on the bed of loose interlocking, supporting elements 25. However, by shifting the supporting elements 25 about beneath the rubber film mold 17 so as to build up portions thereof that are naturally lower and to lower other portions thereof that are naturally elevated, rocks, having quite different overall contours than the natural rock 10 from which the film mold 17 was originally made, can be formed. Also, as shown in FIG. 11, by creasing the rubber film mold 17, such as at 34, at the time the mold 17 is being supported on its bed, additional artificial markings can be provided on surface 18 of the mold 17 and caused to be cast on the artificial rock.

Thus, in FIG. 7, the rubber film mold 17 has been supported by redistributing the elements 25 such that the left end portion 27 is lowered, the middle portion 28 is raised, and the right end portion 29 is lowered and formed with a sharpened cusp 32. It should be appreciated that changes in the levels of portions of the mold can also be made along the width of the film mold, as shown in FIG. 10. A filling 40 of concrete is then poured in the cavity thus formed. The hardened concrete filling 40 when lifted out of the framework 20 and inverted provides a concrete mass, hereinafter referred to as artificial rock 40, as shown in FIG. 8, which has a considerably sharper outer overall contour than the natural rock 10 shown in FIG. 1 from which the rubber film mold 17 was made. Thus, although some of the physical characteristics on the surface 41 of the rock are artificially formed by the manner in which the rubber film mold 17 is distorted by its support elements 25, nevertheless, the majority of the characteristic markings on the surface 41 thereof are similar to those of the natural rock 10 of FIG. 1. Such markings give the rock 40 the appearance of having been obtained from the same location as the natural rock 10, that is, of being from the same family or set of rocks.

Referring next to FIG. 9, the underside of the cavity formed by the rubber film mold 17 has been supported by redistributing the supporting elements 25 so as to raise the left portion 27 and the right portion 29 of the mold 17 to be more in line with the central portion 28 which is left unchanged. Upon filling the cavity so formed with a filling of concrete 45, the resulting concrete mass, hereinafter referred to as artificial rock 45, has a considerably flatter contour than the natural rock 10. Furthermore, artificial rock 45 has cast on its surface 46 both the natural markings and any artificial markings, such as 34, that may have been formed on surface 18 of the film mold 17 at the time it was placed on its supporting bed of elements 25.

It should now be evident that by the use of the process of the present invention, the single rubber film mold 17 produced from a portion or all of the exposed surface of the natural rock 10 can be used to form a large number of differently overall contoured artificial rocks. The artificial rocks have the appearance of coming from the same natural location inasmuch as they have common characteristic markings on the surface thereof caused by the formation and weathering or erosion, to which the natural rocks at that location have been subjected to over the years. Furthermore, it should be evident that such a family of artificial rocks have been obtained in a simplified, inexpensive manner. It should be noted that the elimination of the need of making a support for the film mold out of liquid urethane at the site of the natural rock, and the elimination of the subsequent need of handling the urethane support are of great advantage in lowering the cost of the process.

Furthermore, when several large rocks must be placed and fitted relative to each other to provide a desired structure or to give a desired effect, the builder has, heretofore, had to literally search for natural rocks which have the desired shape. Often he cannot find rocks in a particular location that can be matched to fit his needs. Thus, even if the builder can make exact replicas of the natural rocks as disclosed by the prior art process, he still must in many instances make his structure fit the available rocks rather than acquire rocks to meet his structural requirements. The process of the present invention overcomes this problem.

It should be noted that the fact that the rubber film mold 17 is pliable and can be distorted to assume a different orientation and will then return to its original shape, is of great advantage. This feature not only permits the overall contour to be varied to provide differently shaped artificial rocks, as desired, but, further, this feature enables the rubber film mold to be generally flattened out by hand and rolled up, as indicated in FIGS. 14 and 15. This greatly facilitates the shipment of the rubber film mold to remote areas or even to distant cities where it is desired to artificially form rocks on the construction site where they are to be used. Note that the framework 20 and its bed of small, loose, supporting elements 25 are relatively inexpensive and can therefore be readily and economically provided at the remote site and discarded after use. It should be appreciated that other flowable materials can be used for the bed if the irregular plastic elements are not available. Thus, the bed may be made of gravel or damp sand or soil, or any material which can be readily redistributed, but which will generally maintain its distribution when the concrete is poured into the cavity of the mold supported thereby. In other words, the material must be of the type which can be packed firmly below the film mold to provide the support for its selected contour.

A further manner of using the process of the present invention is to form the sidewalls of a pool or water fall, for example. Thus, it is possible to artifically form rocks having desired contours, surface characteristics, and orientations, in their actual location on the structure being constructed. Such an approach is desirable since it eliminates the need to lift and position the artificial rocks and, furthermore, makes it possible to more readily shape the artificial rocks so that they interfit together.

Such a manner of artificially forming a rock structure is shown in FIG. 16 wherein a generally L-shaped structure 50 is formed in an excavation such as provided for a swimming pool. The structure 50 has a frame comprised of long steel rods 53 (only one of which is shown) spaced along the length of the pool. A plurality of short steel rods 55 are spaced along and laterally protrude from the portions of the steel rods 53 forming the sidewall. As shown in FIG. 17, each short, steel rod 55 has a bent leg 56 secured by wire windings 57 to the long rod 53. Gunnite 54, when blown onto the frame defined by the long steel rods 53, forms the solid sidewall 51 and bottom 52 of the pool. A coating of liquid latex 58 is then applied over the entire surface of the solid sidewall 51. The coating 58 when dried serves as a sealant. As will be described, the solid sidewall 51 with the short steel rods 55 extending therefrom becomes the support for the artificial rock wall 61 to be formed in position on the structure.

Figure 18:
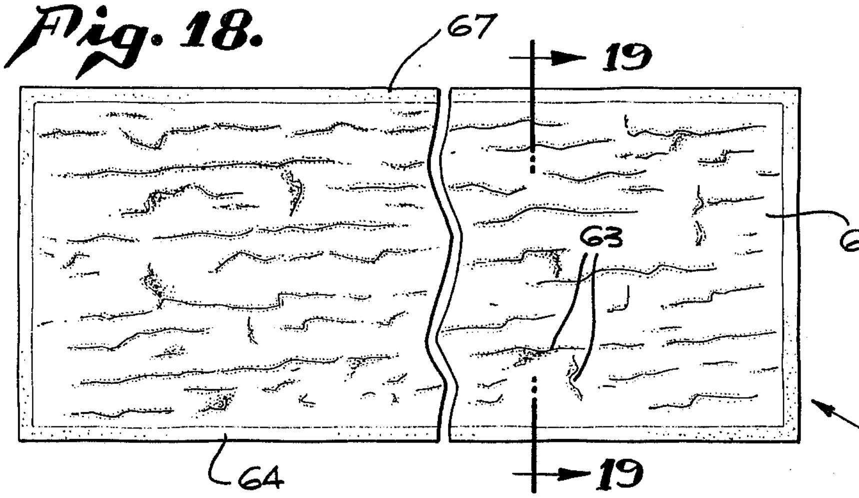
FIG. 18 shows a sheet of rubber film mold used in the modified arrangement of FIG. 16.
Figure 19:
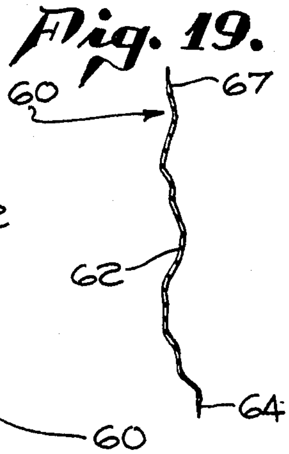
FIG. 19 shows a cross-sectional view of the sheet of rubber film mold as taken along line 19—19 of FIG. 18.

As shown in FIG. 18, a rubber film mold 60 in the form of a large rectangular sheet is provided for forming the artificial rock wall 61. The sheet of rubber film mold 60 was made by applying coatings of liquid latex to a natural rock wall residing in its natural setting in the manner previously described in connection with FIGS. 1 and 2. As noted in the cross-section of the sheet of rubber film mold 60, as taken along lines 19—19 of FIG. 18, the sheet mold 60 has a naturally irregular contoured surface 62 with characteristic markings thereon such as markings 63 which may correspond to strata, crevices, depressions, etc. appearing on the natural rock wall.

Referring back to FIG. 16, to form the artificial rock wall 61 on the sidewall of the pool structure by use of the process of the present invention, a temporary wood wall 65 has its bottom end resting on the bottom 52 of the pool and is supported in position by a brace 66 so as to be spaced from the gunnite sidewall 51, as shown. The sheet of film mold 60 is then effectively suspended to hang down in the opening between the sidewall 51 and the wood wall 65. To hold the sheet film mold 60 in position, its marginal bottom 64 may be secured on the bottom of the wood wall 65 and its marginal top 67 is folded such that it is initially held on the top of the gunnite sidewall 51. The sheet of rubber film mold 60 is so positioned with its surface 62 having the markings of the natural rock wall impressed thereon facing the gunnite sidewall 51. With the film mold 60 so disposed, supporting elements 25 are then dropped down into the space between the mold 60 and the wood wall 65 and distributed at the different vertical and horizontal points so that the sheet mold 60 is distorted and has a desired overall contour. The lightweight and interlocking action of the elements 25 are of considerable aid in maintaining the vertical distribution of the elements.

Figure 20:
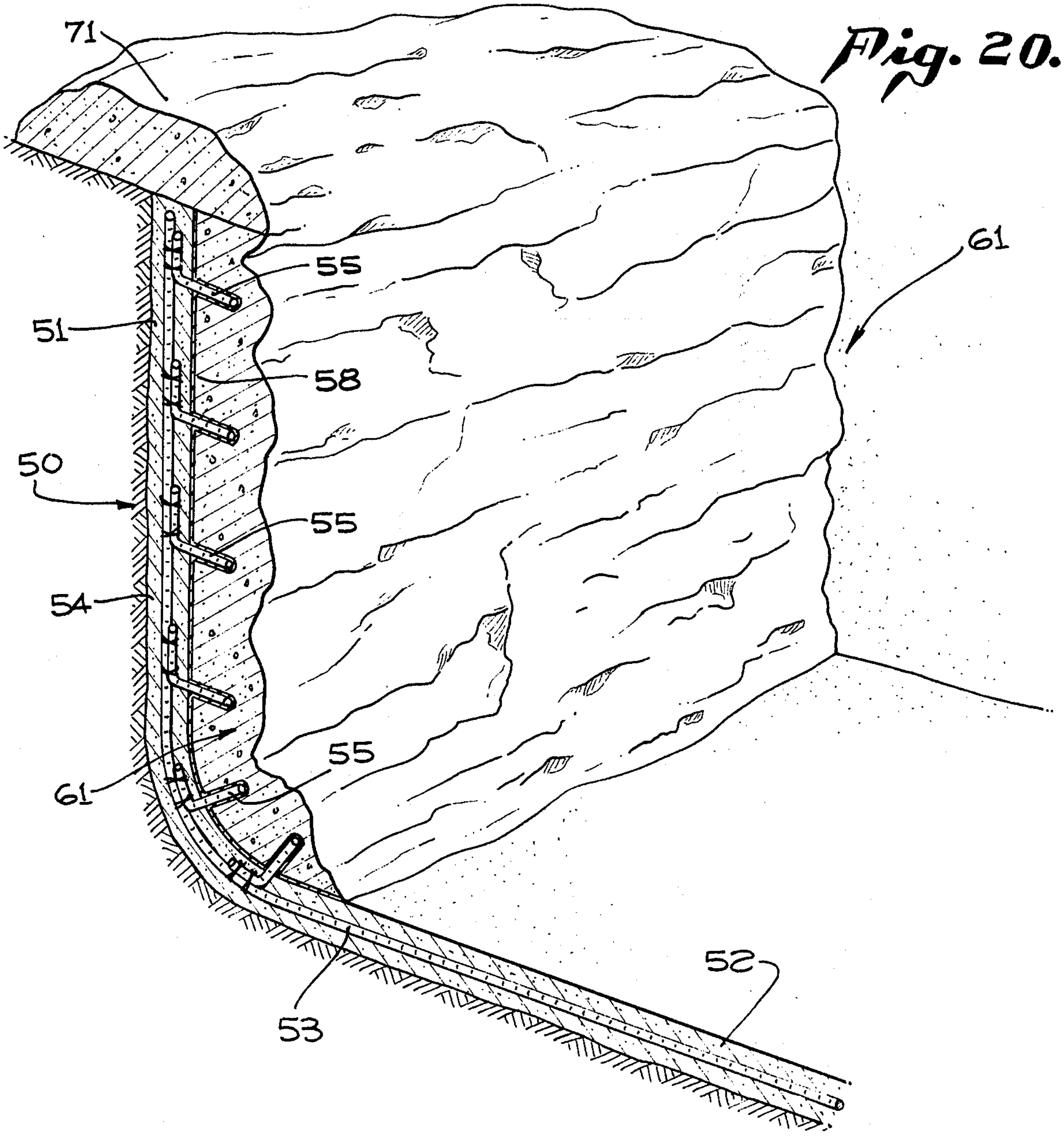
FIG. 20 shows a perspective view of a portion of the complete rock wall for a pool as made by the modified arrangement of FIG. 16.

The marginal top 67 of the sheet of rubber film mold 60 is then folded back to permit a filling of concrete 61 to be poured into the space formed between the surface 62 of the rubber film mold 60 and the gunnite sidewall 51. As is evident, the filling of concrete 61 when hardened becomes the artificial rock wall 61. Note that the lateral short rods 55 provide for strengthening the artificial rock wall 61. When the wood wall 65, supporting elements 25, and sheet of rubber film mold 60 have been removed, and a coping of artificial rock 71 is fitted in position on the upper ledge of the pool, the artificial rock wall 61 has the appearance as shown in FIG. 20.

While the procedure and the resulting product of the invention has been disclosed in detail, it is evident from the disclosure that some latitude in specific details is permissible and, accordingly, it is desired that the scope of the invention be restricted only in accordance with the definition of the invention as portrayed in the appended claims.

What is claimed is:

1. A process for forming artificial rocks comprising:

applying several coatings of a liquid latex on the surface of a natural rock to thereby form a rubber film mold having markings characteristic of the manner of the natural formation and the weathering of said natural rock impressed on the surface thereof, removing said rubber film mold from said natural rock, distributing supporting elements beneath the rubber film mold so as to shape its impressed surface with a first desired overall contour, pouring a first filling of concrete onto the impressed surface of said rubber film mold, separating the first filling of concrete from the rubber film mold after the concrete has hardened with the characteristic markings of the mold cast on the surface thereof, thereafter redistributing the supporting elements beneath the rubber film mold so as to shape its impressed surface with a second desired contour which differs from said first contour, pouring a second filling of concrete onto the impressed surface of said rubber film mold, and separating the second filling of concrete from the rubber film mold after the concrete has hardened with the characteristic markings of the mold cast on the surface thereof, whereby said first and second fillings of concrete form rocks which have the same characteristic markings on the surface thereof but which differ from each other in overall contour.

2. The method of making a set of artificial rocks having distinct resemblance to each other as well as distinct individual differences, from a single mold, comprising the steps of:

forming an elastomeric mold upon the face of a natural rock so as to fully conform to the surface configuration and texture thereof;

removing said mold from the natural rock;

supporting said mold in a sequence of different three-dimensional configurations; and casting into said mold in each of said sequence of different configurations an artifical rock of respectively corresponding shape;

whereby the relatively detailed surface texture of each of said artificial rocks tends to be closely similar to that of the natural rock, while the peaks and valleys in the surfaces of said artificial rocks are in part taken from the natural rock but at the same time are partly a result of the artificial changes in the three-dimensional configuration of said mold.

3. The method of claim 2 wherein said mold is supported upon a bed of small, loose, supporting elements.

4. The method of claim 3 wherein said bed of supporting elements is formed of irregularly shaped polystyrene foam elements having an interlocking action when pressure is applied on the bed.

* * * * *